(12) United States Patent
Beer

(10) Patent No.: US 6,293,411 B1
(45) Date of Patent: Sep. 25, 2001

(54) INTEGRAL SUPPORTED SEPARATION MEMBRANES

(75) Inventor: Hans Beer, Bössinghausen (DE)

(73) Assignee: Sartorius AG (DE)

( * ) Notice: Subject to any disclaimer, the term of this patent is extended or adjusted under 35 U.S.C. 154(b) by 0 days.

(21) Appl. No.: 09/406,046

(22) Filed: Sep. 27, 1999

(30) Foreign Application Priority Data

Jul. 10, 1997 (DE) .............................................. 197 29 456
Jul. 8, 1998 (EP) ..................................... PCT/EP98/04228

(51) Int. Cl.[7] .......................... B01D 69/10; B01D 69/12
(52) U.S. Cl. ..................... 210/490; 210/483; 210/488; 210/489; 210/500.29; 210/500.3; 210/500.38; 210/500.41; 210/500.43; 210/504; 210/505; 210/506; 210/508
(58) Field of Search ................................... 210/483, 488, 210/489, 490, 504, 505, 506, 508, 500.29, 500.3, 500.38, 500.41, 500.43

(56) References Cited

U.S. PATENT DOCUMENTS

| | | | | |
|---|---|---|---|---|
| 4,340,479 | * | 7/1982 | Pall | 210/490 |
| 5,108,827 | * | 4/1992 | Gessner | 428/374 |
| 5,500,167 | * | 3/1996 | Degen | 210/490 |
| 5,989,432 | * | 11/1999 | Gildersleeve et al. | 210/490 |

* cited by examiner

*Primary Examiner*—John Kim
(74) *Attorney, Agent, or Firm*—Chernoff, Vilhauer, McClung & Stenzel, LLP

(57) ABSTRACT

Supported separation membranes are disclosed wherein the permselective membrane is integral with a polymeric support of non-woven fibers having a particular air permeability, the integral membranes exhibiting far superior lifetimes and retention capability, especially for microorganisms.

6 Claims, No Drawings

INTEGRAL SUPPORTED SEPARATION MEMBRANES

Pursuant to 35 USC §§119 and 365 the priority of PCT/EP 98/04228 filed Jul. 8, 1998 and DE 197 29 456.1 filed Jul. 10, 1997 is claimed.

BACKGROUND OF THE INVENTION

The invention concerns integral porous separation membranes supported on nonwoven polymeric supports such as are typically employed as filter media in conventional filtration modules for the filtration of fluids.

The term "porous separation membranes" is generally understood to refer to ultrafiltration and microfiltration membranes that have pores with diameters of about 0.001 to 0.1 μm and about 0.01 to 30 μm, respectively. Such membranes are conventionally fabricated from organic polymers, and are often brittle, with little capacity for mechanical loads. For increasing mechanical structural strength, porous membranes of organic polymers are supported with a wide variety of support materials such as woven material, knitted fabrics, non-woven materials, or films. The terms "integral" and "nonintegral" are differentiated by the type of bonding between the membrane and the support material.

The term "integral supported membranes," refers to those wherein the still fluid permselective membrane material is brought into contact with the support material and the membrane is formed by the mutually interpenetrating bond formed between the permselective membrane and the support. The support then, to a certain extent, penetrates into the membrane or may even be entirely encapsulated by the membrane. The membrane can be reinforced on one or both sides.

In contradistinction, in the case of a non-supported membrane, the already cast permselective membrane is applied directly onto the support by, for instance, lamination or by an adhesive. From the viewpoints of production and applications, integral supported separation membranes are preferable.

The cost of the production of integral supported separation membranes is governed by the degree of increase of mechanical strength desired, but increased mechanical strength is typically attainable at the cost of loss of service life or filtration capacity, often up to some 40% and usually accompanied by a decrease in retention capability for the substances to be removed, all as compared to non-supported membranes. Such drawbacks are unacceptable in industrial applications.

Thus, the object of the invention is the provisions of integral supported membranes having longer service lifetimes, higher filtration capacity and improved retention capability. This object and others which will become apparent to one of ordinary skill are met by the present invention, which is summarized and described in detail below.

BRIEF SUMMARY OF THE INVENTION

The invention comprises the provision of integral supported porous separation membranes wherein the support for the permselective membrane is made of a mat or fleece of compacted non-woven fibers the mat exhibiting a basis weight of from about 20 to about 40 g/m$^2$, a thickness from about 90 to about 170 μm and an air permeability of between about 1200 and about 2400 L/m$^2$·s at a pressure of 0.002 bar.

Rather surprisingly, it has been discovered that the integrated supported membranes of the present invention exhibit a number of unexpected advantages at the same flux relative to integral supported membranes of the prior art. Membranes fabricated in accord with the present invention have improved retention capability, particularly for microorganisms, and can be monitored with greater safety for integrity, since they possess a bubble point some 40% higher and a rate of diffusion reduced by about a factor of 10 to 20. These advantages permit filtration equipment equipped with such supported membrane to be tested for integrity with greater safety, especially in sensitive filtration applications such as pharmaceuticals, biotechnicals, and in the food and beverage industries. Similar advantages are gained with filtration devices for medical and gene technology, where a higher degree of safety is paramount.

DETAILED DESCRIPTION OF THE PREFERRED EMBODIMENTS

In a preferred embodiment of the invention, the non-woven material for the support comprises a multi-component or composite fiber, wherein the composite includes a first polymer and a second polymer such that the second polymer is present on at least a portion of the surface of the composite fibers and exhibits a glass transition temperature which is lower than the glass transition temperature of the first polymer.

In a further preferred embodiment, the composite nonwoven fiber support is made out of a mat of fibers, wherein the core advantageously comprises a polymer having a higher glass transition temperature, for instance polypropylene, with an enveloping outside layer of a chemically resistant, thermoplastic polymer, such as polyethylene.

The permselective separation membrane itself may be formed from any polymer which is suitable for the formation of a porous membrane according phase inversion casting techniques, including solvent evaporation, coagulation bath and combinations of these processes. Particularly well-adapted to such procedures are membranes cast from polysulfones, polyethersulfones, polyamides, polyacrylamides, polyacrylnitriles, cellulose hydrates and cellulose esters. Particularly preferred are polyethersulfones, polyamides and the cellulosic esters cellulose acetate, cellulose nitrate and mixtures of the two.

The integral supported separation membranes of the invention can be fabricated into filters which are flat, pleated or tubular, and may even be used as a support material for additional membrane layers.

EXAMPLE 1

A permselective membrane casting dope containing 7.2 wt % cellulose acetate was cast by a conventional phase inversion technique onto a compacted non-woven fiber support material to a thickness of about 130 μm wherein the non-woven fiber support material comprised a mat of fibers, the fibers having a polypropylene core with a surrounding layer of polyethylene. The thickness of the non-woven mat support was about 130 μm, its basis weight about 30 g/m$^2$, and its air permeability about 1800 L/m$^2$·s at 0.002 bar.

The so-formed integral supported separation membrane had a bubble point of 3.2 bar and a diffusion rate of ≦2.3×10$^{-3}$ ml/cm$^2$ at a pressure differential of 2 bar or approximately 0.8×10$^{-3}$ ml/cm$^2$ at a pressure differential of 1.5 bar. Its permeability to RO water at room temperature was 14.8 ml/cm$^2$/min·bar. The membrane quantitatively retained the bacterium Brevibacterium diminutum with a logarithmic reduction value (LRV) of >8.

The service life or filtration capacity of a separation membrane is conventionally expressed as flux in the filtration of a 10% aqueous brown raw sugar solution through the membrane at a pressure differential of 1 bar for 10 minutes, as compared to the flux of the same solution through a standard (0.45 µm pore polyamide-6.6) membrane under the same conditions, and is expressed as a percentage of the capacity of the standard membrane filter. When so measured, service life of the integral supported membrane of the present invention was 450%.

Comparative Example

A second integral supported separation membrane was fabricated in substantially the same manner as in Example 1, except that the support was a 250 µm-thick mat of different non-woven polymeric fibers having the same basis weight as the support of Example 1 and an air permeability of about 4000 L/m²·s at 0.002 bar.

This comparative integral supported separation membrane had a bubble point of 2.8 bar, a diffusion rate of $\geq 13.1 \times 10^{-3}$ ml/cm·min at a pressure differential of 1.5 bar and permitted bacteria to quantitatively pass the same bacterium as in Example 1 with an LRV of zero. Its permeability to RO water at room temperature was substantially the same as the integral supported membrane of Example 1, and its service life was 97% as measured in the same manner as in Example 1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An integral polymeric porous integrally supported separation membrane consisting essentially of a permselective membrane and a support wherein the support consists essentially of a mat of compacted non-woven fiber, said mat having a basis weight of from about 20 to about 40 g/m², a thickness of from about 90 to about 170 µm and an air permeability from about 1200 to about 2400 L/m²·s at a pressure of 0.002 bar and wherein said non-woven fiber is a composite consisting essentially of a polypropylene core and a polyethylene sheath around said core.

2. The supported separation membrane of claim 1 wherein said mat of non-woven fiber has a basis weight of about 30 g/m², a thickness of about 130 µm and an air permeability of 1800 L/m²·s at a pressure of 0.002 bar.

3. The supported separation membrane of claim 1 wherein said first support is on one side.

4. The supported separation membrane of claim 1 wherein said permselective membrane is microporous.

5. The supported separation membrane of claim 1 wherein said permselective membrane comprises a polymer selected from the group consisting of polysulfones, polyethersulfones, polyamides, polyacrylnitriles, cellulose hydrates and cellulose esters.

6. The supported separation membrane of claim 5 wherein said cellulose esters are selected from the group consisting of cellulose acetate, cellulose nitrate and mixtures thereof.

* * * * *